United States Patent
Oh et al.

(10) Patent No.: US 11,404,736 B2
(45) Date of Patent: Aug. 2, 2022

(54) POUCH TYPE METAL-AIR BATTERY

(71) Applicants: Hyundai Motor Company, Seoul (KR); Kia Motors Corporation, Seoul (KR)

(72) Inventors: Gwang Seok Oh, Gyeonggi-do (KR); Young Suk Cho, Sejong (KR); Hoi Min Kwon, Gyeonggi-do (KR); Su Hyun Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/095,527

(22) Filed: Nov. 11, 2020

(65) Prior Publication Data

US 2021/0376412 A1 Dec. 2, 2021

(30) Foreign Application Priority Data

Jun. 2, 2020 (KR) .......................... 10-2020-0066534

(51) Int. Cl.
*H01M 12/08* (2006.01)
*H01M 50/116* (2021.01)
*H01M 4/583* (2010.01)
*H01M 4/86* (2006.01)
*H01M 4/88* (2006.01)
(Continued)

(52) U.S. Cl.
CPC ........... *H01M 12/08* (2013.01); *H01M 4/583* (2013.01); *H01M 4/8621* (2013.01); *H01M 4/8807* (2013.01); *H01M 4/9041* (2013.01); *H01M 4/92* (2013.01); *H01M 50/116* (2021.01); *H01M 2004/8689* (2013.01)

(58) Field of Classification Search
CPC ..................................................... H01M 12/08
See application file for complete search history.

(56) References Cited

U.S. PATENT DOCUMENTS 5,733,677 A * 3/1998 Golovin .............. H01M 12/065
429/407
6,632,557 B1 * 10/2003 Curelop .................. H01M 4/90
429/405
(Continued)

FOREIGN PATENT DOCUMENTS

| KR | 2016-0131606 A | 11/2016 |
| KR | 2019-0145552 | 11/2019 |
| KR | 2020-0010873 A | 1/2020 |

*Primary Examiner* — Brian R Ohara
(74) *Attorney, Agent, or Firm* — Fox Rothschild LLP

(57) ABSTRACT

Disclosed is a pouch type metal-air battery. In the pouch type metal-air battery, when the electrolyte inside the cell comes out of the electrode assembly by applying external pressure, the electrolyte does not reach the space partitioned by the gas diffusion layer, the electrode assembly and the exterior material, due to the step caused by the projection part of the gas diffusion layer. As such, a plurality of pores in the exterior material, which corresponds to the space, may not be blocked. Therefore, since oxygen selectively permeated from the exterior material flows into the gas diffusion layer, and flows into the electrode assembly through the diffusion portion of the gas diffusion layer, the contact resistance with pressure may improve and the initial driving conditions and driving reproducibility may be secured.

15 Claims, 7 Drawing Sheets

(51) Int. Cl.
*H01M 4/90* (2006.01)
*H01M 4/92* (2006.01)

(56) References Cited

U.S. PATENT DOCUMENTS

| | | | | |
|---|---|---|---|---|
| 2004/0241537 A1* | 12/2004 | Okuyama | ............ | H01M 50/116 429/86 |
| 2011/0059355 A1* | 3/2011 | Zhang | .................... | H01M 4/62 429/188 |
| 2013/0171527 A1* | 7/2013 | Lanning | ................ | H01M 4/861 429/405 |

* cited by examiner

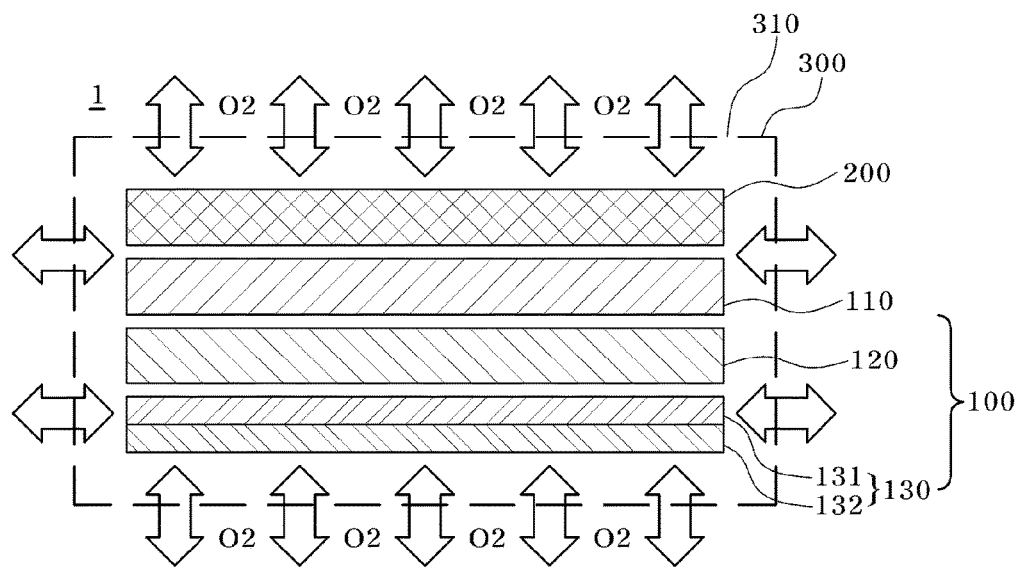
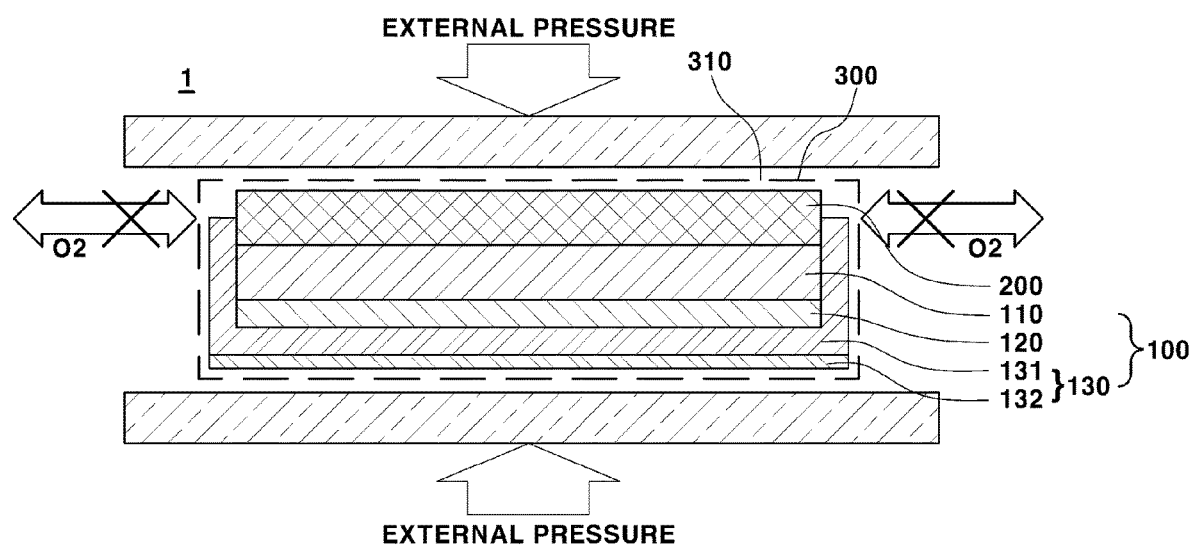

POUCH TYPE METAL-AIR BATTERY

CROSS REFERENCE TO RELATED APPLICATION

The present application claims priority to Korean Patent Application No. 10-2020-0066534, filed Jun. 2, 2020, the entire contents of which is incorporated herein for all purposes by this reference.

FIELD OF THE INVENTION

The present invention relates to a pouch type metal-air battery in which a fluid such as oxygen flows smoothly even under the condition of pressure applied to reduce contact resistance.

BACKGROUND

As a battery obtained by replacing the cathode active material of a lithium ion secondary battery with air, the lithium metal-air battery has advantages that it has an energy density 10 times greater than that of a lithium ion secondary battery using an existing cathode active material and it is capable of significantly reducing weights of the cathode and even the entire battery, because oxygen contained in the air is used as a raw material for the reduction reaction during discharge.

Such lithium-air batteries may be formed in a pouch type, a cylindrical type, a coin type, and the like and may be in a form in which holes are drilled only in the cathode to allow air to pass therethrough. Among them, a pouch type lithium-air battery has an advantage that it is capable of being manufactured in various forms to realize a high energy density per mass.

However, since the pouch type lithium-air battery has been prepared by making oxygen inlet holes in the cathode, an electrolyte 400 may leak or may be volatilized from the holes and the holes also makes it difficult to perform compression molding. This causes low energy density and makes it difficult to be formed in a large area. Moreover, in addition to the inflow of oxygen, moisture and gases such as carbon dioxide and nitrogen in the atmosphere flow in, to cause side effects, such as battery degradation. Accordingly, in order to drive the lithium-air battery in the atmosphere, a dehumidifying system or a pure oxygen gas cylinder must be provided, which is inconvenient. Therefore, by sealing an electrode assembly 100 using an exterior material 300 that selectively transmits only oxygen while blocking moisture or gas in the atmosphere, oxygen permeability of the pouch type metal-air battery has been improved.

However, even when the pouch type metal-air battery is manufactured by applying the exterior material 300, the inflow of fluid such as oxygen is not smoothly performed. That is, FIG. 1A is a cross-sectional view showing a pouch type metal-air battery 1 to which an exterior material 300 is applied when pressure is not applied. For example, as shown in FIG. 1A, the pouch type metal-air battery 1 includes an electrode assembly 100 including a cathode layer 110, an anode layer 130, and a separator 120 located between the cathode layer 110 and the anode layer 130; a gas diffusion layer 200 located on the electrode assembly 100; and an exterior material 300 accommodating the electrode assembly 100 and the gas diffusion layer 200 and having fluid permeability. Although oxygen supplied from the pores 310 included on all surfaces of the exterior material 300 is received smoothly, contact resistance may increase when pressure is not applied, whereby there is a problem that it is difficult to operate the battery.

In addition, FIG. 1B is a cross-sectional view showing a pouch type metal-air battery 1 to which an exterior material 300 is applied when pressure is applied. As shown in FIG. 1B, oxygen may be supplied to a side having a space in the pouch type metal-air battery 1 when pressure is applied. However, when the width of the exterior material is the same as or less than that of the gas diffusion layer 200 and the electrode assembly 100, an anode included in the electrode assembly 100 may be pressed by the pressure so that sides of the electrode assembly 100 and the gas diffusion layer 200 may be blocked, which results in that it is difficult to supply sufficient oxygen.

In addition, FIG. 1C is a cross-sectional view showing a pouch type metal-air battery 1 to which an exterior material 300 is applied when pressure is applied after the electrolyte 400 is injected. As shown in FIG. 1C, since the electrolyte 400 may be squeezed out of the electrode assembly 100, the sides of the electrode assembly 100 and the gas diffusion layer 200 may be blocked, which also results in that it is difficult to supply sufficient oxygen.

SUMMARY

In preferred aspects, provided is a pouch type metal-air battery ("battery"). The battery may include a gas diffusion layer including a diffusion portion in contact with the electrode assembly and one or more projection parts extending from the diffusion portion; an electrode assembly; and an exterior material. Preferably, a step between the electrode assembly and the gas diffusion layer may be formed by the projection part, and a space partitioned by the gas diffusion layer, the electrode assembly, and the exterior material may be formed. As such, even when the pressure is applied to reduce the contact resistance, fluid such as oxygen smoothly may flow in.

The term "pouch type battery" as used herein refers to a battery or battery cell designed to seal, surround, wrap or weld each electrode assembly by a pouch-like flexible container (e.g., conductive material, metal, or polymer pouch), and each of the pouch-like container carries or accommodates essential battery cell components or electrode assembly, such as an electrode (e.g, a cathode and anode), a separator disposed between the electrodes, electrolyte, a gas diffusion layer, and the like. The each of the pouch-like container may further include a connecting part, e.g., for connection between, or a portion for exchanging materials inside thereof with others, which can stacked or packed in either horizontal or vertical directions.

The object of the present invention is not limited to the object mentioned above. The object of the present invention will be more apparent from the following description, and will be realized by means described in the claims and combinations thereof.

In an aspect, provided is a pouch type metal-air battery that may include an electrode assembly including a cathode layer, an anode layer, and a separator located between the cathode layer and the anode layer; a gas diffusion layer (GDL) located on the electrode assembly; and an exterior material accommodating the electrode assembly and the gas diffusion layer and having fluid permeability. Preferably, the gas diffusion layer may include a diffusion portion in contact with the electrode assembly; and one or more projection parts extending from the diffusion portion.

The "diffusion portion" refers to a part constituting the gas diffusion layer which allows a flow, diffusion, or permeation of a material, e.g., gas.

A step between the electrode assembly and the gas diffusion layer may be formed by the projection part, and a space partitioned by the gas diffusion layer, the electrode assembly, and the exterior material may be formed.

The gas diffusion layer may include two or more projection parts.

The pouch type metal-air battery may further include a stack in which multiple electrode assemblies 100 are stacked. Preferably, the gas diffusion layer may be located at least between the electrode assemblies adjacent to each other or both ends of the stack.

A ratio of a length of the diffusion portion and a length of the projection part may be about 1:0.2 to 1:0.4.

The battery may be operated under pressure of about 0.59 to 1.3 kgf/cm$^2$.

The diffusion portion of the gas diffusion layer may be located on the cathode layer.

The gas diffusion layer may include a porous metal substrate.

The "porous substrate" as used herein refers to a porous material that includes plurality of shapes of pores (e.g., circular, or non-circular), holes, cavity (e.g., microcavity), labyrinth, channel or the like, whether formed uniformly or without regularity. Exemplary porous substrate may include pores (e.g., closed or open pores) within a predetermined size within a range from sub-micrometer to micrometer size, which is measured by maximum diameter of the pores.

The porous metal substrate may include one or more selected from the group consisting of nickel foam, aluminum mesh, and stainless mesh.

The cathode layer may include one or more selected from the group consisting of carbon paper, carbon black, reduced oxide graphene, carbon nanotube, and acetylene black.

The cathode layer may include one or more catalysts selected from the group consisting of nickel, gold (Au), silver (Ag), rubidium (Ru), and platinum (Pt).

The exterior material may include a plurality of pores.

The exterior material may be capable of selectively allowing oxygen to permeate.

The oxygen permeated from the exterior material may flow into the gas diffusion layer (GDL) and flow into the electrode assembly through the diffusion portion of the gas diffusion layer (GDL).

The exterior material may include one or more materials selected from the group consisting of plyethyleneterephthalate (PET), high density polyethylene (HDPE), plytetrafluoroethylene, and pymethylmethacrylate.

The exterior material may be a metal organic framework permeable membrane with which one or more polymers selected from the group consisting of plyethyleneterephthalate (PET), high density polyethylene (HDPE), polytetrafluoroethylene, and polymethylmethacrylate are mixed.

According to various exemplary embodiments, the pouch type metal-air battery is provided so that, even when the electrolyte inside the cell comes out of the electrode assembly by applying external pressure, the electrolyte does not reach the space partitioned by the gas diffusion layer, the electrode assembly, and the exterior material due to the step formed by the projection part of the gas diffusion layer. As such, the plurality of pores in the exterior material, which corresponds to the space, may not be blocked. Therefore, since oxygen selectively permeated from the exterior material flows into the gas diffusion layer, and flows into the electrode assembly through the diffusion portion of the gas diffusion layer, the contact resistance with pressure may improve, and the initial driving conditions and driving reproducibility may be secured in the pouch type metal-air battery.

The effects of the present invention are not limited to the effects mentioned above. It should be understood that the effects of the present invention include all effects that can be deduced from the following description.

Other aspects of the invention are disclosed infra.

BRIEF DESCRIPTION OF THE DRAWINGS

The above and other objects, features and other advantages of the present invention will be more clearly understood from the following detailed description when taken in conjunction with the accompanying drawings, in which:

FIG. 1A is a cross-sectional view showing a pouch type metal-air battery 1 to which an exterior material 300 is applied when pressure is not applied;

FIG. 1B is a cross-sectional view showing a pouch type metal-air battery 1 to which an exterior material 300 is applied when pressure is applied;

DETAILED DESCRIPTION OF THE INVENTION

Figure 1C:
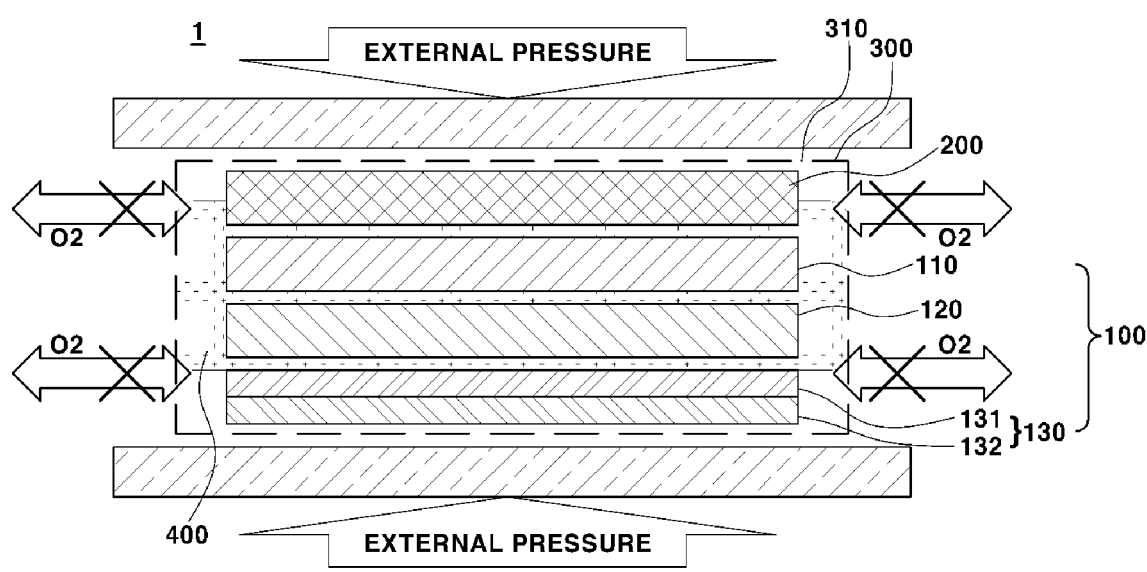
FIG. 1C is a cross-sectional view showing a pouch type metal-air battery 1 to which an exterior material 300 is applied when pressure is applied, after electrolyte 400 is injected.

The above objects, other objects, features, and advantages of the present invention will be readily understood through the following preferred embodiments related to the accompanying drawings. However, the present invention is not limited to embodiments described herein and may be embodied in other forms. Rather, embodiments introduced herein are provided to enable the disclosed contents to be thorough and complete and to fully convey the spirit of the present invention to those skilled in the art.

In describing each drawing, similar reference numerals are used for similar components. In the accompanying drawings, the dimensions of the structure are shown in an enlarged scale than actual for clarity of the present invention. Singular expressions include plural expressions unless the context clearly indicates otherwise.

In this specification, it should be appreciated that terms "comprise" or "include" are intended to indicate that there are features, numbers, steps, actions, components, parts or combinations thereof described in the specification, and not to preclude the existence or addition possibility of one or more other features or numbers, steps, actions, components, parts or combinations thereof. In addition, when a portion of a layer, film, region, plate, or the like is referred to as being "on" other portion, it includes not only a case that the portion is "directly above" the other portion, but also a case that the still other portion is included between in. Conversely, when a portion of a layer, film, region, plate, or the like is referred to as being "under" other portion, it includes not only a case that the portion is "underneath" the other portion, but also a case that the still other portion is included in between.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when numerical ranges are disclosed in the present description, these ranges are continuous, and include all values from the minimum value to the maximum value in this range, unless otherwise indicated. Furthermore, when such a range refers to an integer, all integers including from the minimum value to the maximum value are included unless otherwise indicated.

In the present specification, when a range is described for a variable, it will be understood that the variable includes all values within the stated range including the described endpoints of the above range. For example, it will be understood that a range of "5 to 10" includes values of 5, 6, 7, 8, 9, and 10, as well as any subrange of 6 to 10, 7 to 10, 6 to 9, 7 to 9, and the like, and also includes any values between integers within the stated ranges, such as 5.5 to 7.5, 5.5 to 8.5, 6.5 to 9, and the like. In addition, for example, the range of "10% to 30%" includes all integers ranging from 10%, 11%, 12%, 13%, etc. to 30%, as well as any subranges from 10% to 15%, 12% to 18%, 20% to 30%, and the like, and also includes any values between valid integers within the stated range, such as 10.5%, 15.5%, 25.5%, and the like.

Figure 2A:
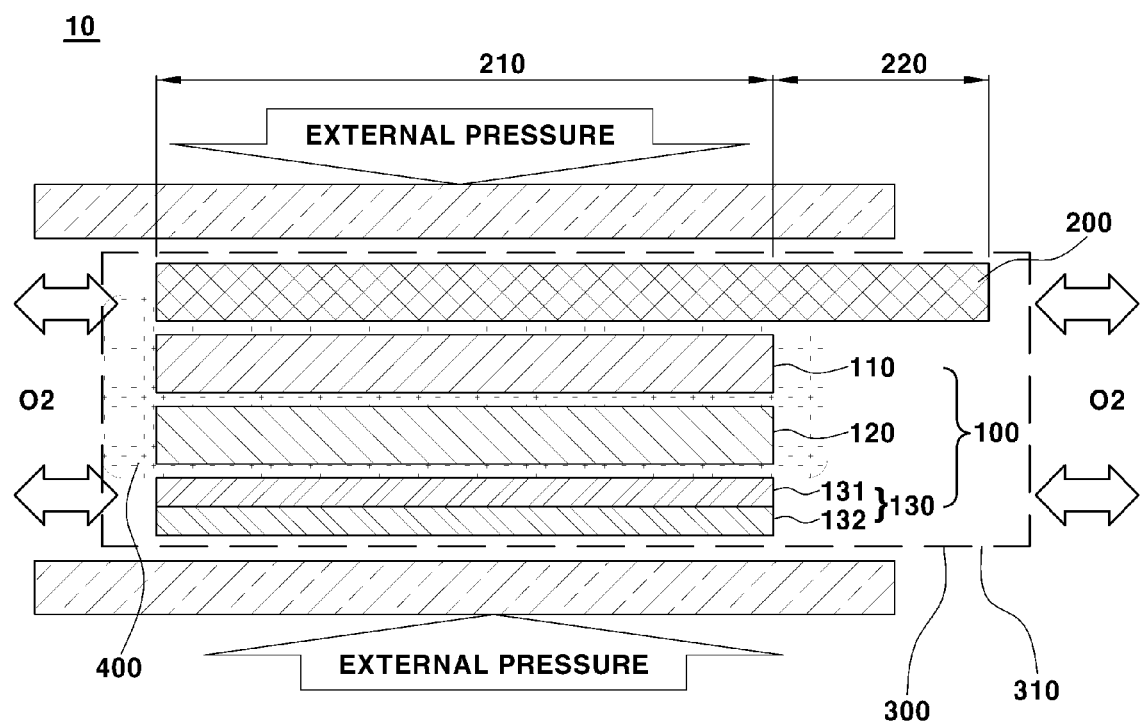
FIG. 2A is a cross-sectional view schematically showing an exemplary pouch type metal-air battery 10 according to an exemplary embodiment of the present invention.

FIG. 2A is a cross-sectional view schematically showing an exemplary pouch type metal-air battery 10 according to an exemplary embodiment of the present invention. As shown in FIG. 2A, the pouch type metal-air battery 10 includes an exemplary electrode assembly 100 including a cathode layer 110, an anode layer 130, and a separator 120 located between the cathode layer 110 and the anode layer 130; a gas diffusion layer 200 (GDL) located on the electrode assembly 100; and an exterior material 300 accommodating the electrode assembly 100 and the gas diffusion layer 200 and having fluid permeability. Here, the term "accommodating" means that the electrode assembly 100 is entirely covered with the exterior material 300. Preferably, the pouch type metal-air battery 10 according to an exemplary embodiment of the present invention is provided so that the gas diffusion layer 200 may include a diffusion portion 210 in contact with the electrode assembly 100; and one or more projection parts 220 extending from the diffusion portion 210.

A ratio of the length of the diffusion portion 210 to the length of the projection part 220 may be about 1:0.2 to 1:0.4. When the above described ratio is less than about 1:0.2, the electrode assembly may block the gas diffusion layer by the applied pressure, and when it is greater than about 1:0.4, area and weight of the gas diffusion layer may increase to cause a cell energy density to decrease. In particular, the projection part 220 having the length ratio compared to the diffusion portion 210 may be provided, so that a step may be formed between the electrode assembly 100 and the gas diffusion layer 200 and a space partitioned by the gas diffusion layer 200, electrode assembly, 100 and exterior material 300 may be formed. Preferably, the pouch type metal-air battery 10 may be provided so that the space partitioned by gas diffusion layer 200, electrode assembly 100, and exterior material 300 due to the step formed by the projection part 220 may be formed because the projection part 220 of the gas diffusion layer 200 is out of the pressure application region. As such, oxygen selectively permeated from the exterior material 300 may flow into the gas diffusion layer 200 and then flow into the electrode assembly 100 through the diffusion portion 210 of the gas diffusion layer 200 (GDL), so as to improve contact resistance due to pressure.

When the pouch type metal-air battery 10 includes a gas diffusion layer 200 having a ratio of the length of the diffusion portion 210 to the length of the projection part 220, the pouch type metal-air battery 10 is capable of securing the initial driving conditions and driving reproducibility even in a state where pressure of about 0.59 to 1.3 kgf/cm$^2$ is applied. When the pressure is less than about 0.59 kgf/cm$^2$, contact resistance may not be increased due to poor contact between the electrodes, and when the pressure is greater than about 1.3 kgf/cm$^2$, the gas diffusion layer may be excessively pressed to make for the external oxygen difficult to flow into the cathode layer through the gas diffusion layer. Particularly, even when the electrolyte 400 inside the cell comes out of the electrode assembly 100 when external pressure is applied, the pouch type metal-air battery may be provided so that the electrolyte 400 does not reach the space partitioned by the gas diffusion layer 200, the electrode assembly 100, and the exterior material 300 due to the step caused by the projection part 220 of the gas diffusion layer 200. As such, the plurality of pores 310 in the exterior material 300, which corresponds to the space, may not be blocked to cause oxygen to selectively permeate. Therefore, the pouch type metal-air battery 10 according to an exemplary embodiment of the present invention may have advantages that the contact resistance with pressure may be improved, as well as initial driving conditions and driving reproducibility may be secured.

Figure 2B:
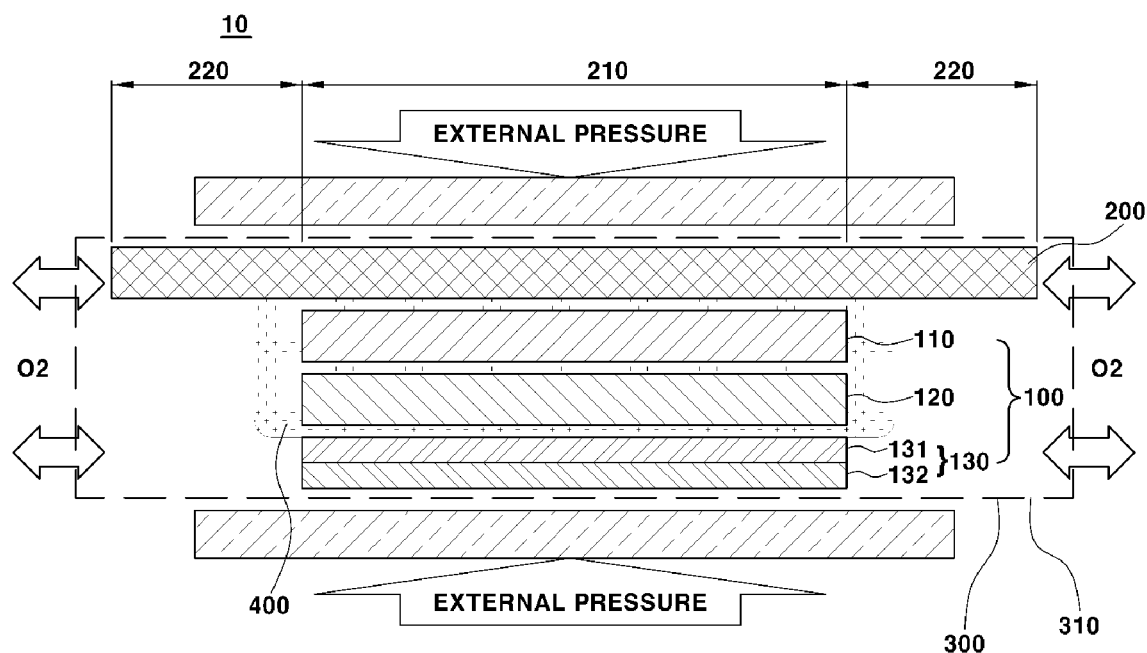
FIG. 2B is a cross-sectional view schematically showing an exemplary pouch type metal-air battery 10 including an exemplary stack in which multiple electrode assemblies 100 are stacked; and an exemplary gas diffusion layer 200 located at least between the electrode assemblies 100 adjacent to each other or both ends of the stack and having two projection parts 220 according to an exemplary embodiment of the present invention.

In addition, the pouch type metal-air battery 10 according to an exemplary embodiment of the present invention may include a stack of multiple electrode assemblies 100 each including a cathode layer 110, an anode layer 130, and a separator 120 located between the cathode layer 110 and the anode layer 130; a gas diffusion layer 200 located at least between the electrode assemblies 100 adjacent to each other or both ends of the stack; and an exterior material 300 accommodating the electrode assemblies 100 and gas diffusion layer 200 and having fluid permeability. Preferably, the pouch type metal-air battery 10 may be provided so that the gas diffusion layer 200 includes a diffusion portion 210 in contact with the electrode assembly 100; and one or more projection parts 220 extending from the diffusion portion 210. FIG. 2B is a cross-sectional view schematically showing a pouch type metal-air battery 10 according to another embodiment of the present invention. As shown in FIG. 2B, a stack in which four electrode assemblies 100 are stacked may be included, and the gas diffusion layer 200 may be located between the electrode assemblies 100 adjacent to each other. Particularly, the pouch type metal-air battery 10 may be configured in a stack in which a number of electrode assemblies 100 are stacked, such that charging and discharging performance of the battery can be further improved.

Figure 3A:
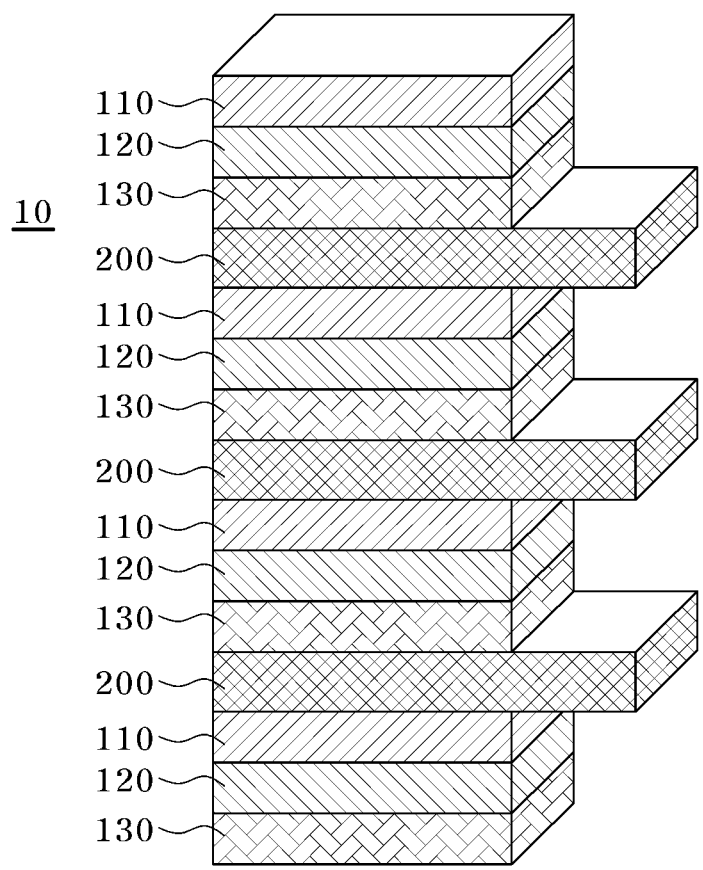
FIG. 3A is a cross-sectional view schematically showing an exemplary pouch type metal-air battery 10 including an exemplary gas diffusion layer 200 having two or more projection parts 220 according to an exemplary embodiment of the present invention.

In addition, the pouch type metal-air battery 10 according to an exemplary embodiment of the present invention may include an electrode assembly 100 including a cathode layer 110, an anode layer 130, and a separator 120 located between the cathode layer 110 and the anode layer 130; a gas diffusion layer 200 (GDL) located on the electrode assembly 100; and an exterior material 300 accommodating the electrode assembly 100 and the gas diffusion layer 200 and having fluid permeability. Herein, the gas diffusion layer 200 includes a diffusion portion 210 in contact with the electrode assembly 100 and one or more projection parts 220 extending from the diffusion portion 210. The projection part 220 may form a step to be generated between the electrode assembly 100 and the gas diffusion layer 200, and a space to be partitioned by the gas diffusion layer 200, electrode assembly 100, and the exterior material 300 may be formed. Preferably, the gas diffusion layer 200 may include two or more projection parts 220. For example, the gas diffusion layer 200 may be manufactured in a variety of shapes according to the manufacturing requirements of the pouch type metal-air battery, and may be preferably in the shape of a polygon such as a triangle, square, rectangle, pentagon, and hexagon. Particularly, when the gas diffusion layer 200 is formed with a polygon, the projection part 220 of the gas diffusion layer 200 (GDL) may include two or more parts in a direction that line segments constituting the polygon extend from the center of the polygon. FIG. 3A is a cross-sectional view schematically showing a pouch type metal-air battery 10 according to an exemplary embodiment of the present invention. As shown in FIG. 3A, when the upper gas diffusion layer 200 is formed with a rectangular, the parallel line segments may extend in extending direction so that the projection part 220 may include two parts.

However, the present invention is not limited thereto, and the remaining two line segments may extend so that the projection part 220 includes four parts. Therefore, the pouch type metal-air battery 10 according to an exemplary embodiment is provided so that the projection part 220 of the gas diffusion layer 200 includes two or more parts. As such, the space partitioned by the gas diffusion layer 200, the electrode assembly 100, and the exterior material 300 formed by the step due to the two or more projection parts 220 may be efficiently secured. Therefore, oxygen can be selectively permeated through the space, so that contact resistance according to pressure can be improved.

Figure 3B:
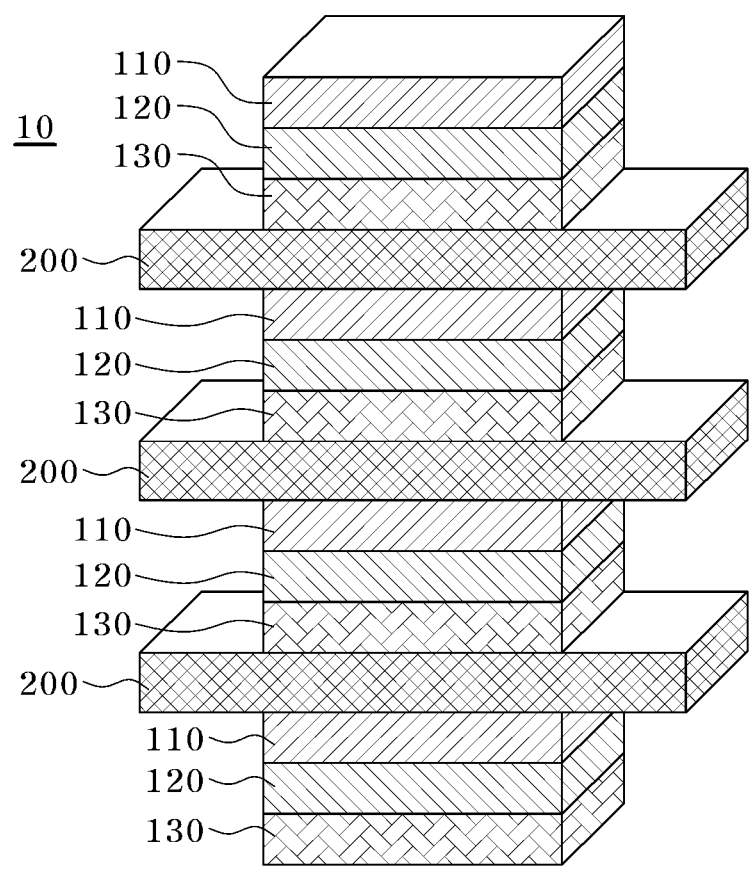
FIG. 3B is a cross-sectional view schematically showing an exemplary pouch type metal-air battery 10 including an exemplary stack in which multiple electrode assemblies 100 are stacked; and an exemplary gas diffusion layer 200 located at least between the electrode assemblies 100 adjacent to each other or both ends of the stack and having two projection parts 220 according to an exemplary embodiment of the present invention.

In addition, the pouch type metal-air battery 10 according to an exemplary embodiment of the present invention may include a stack of multiple electrode assemblies 100 each including a cathode layer 110, an anode layer 130, and a separator 120 located between the cathode layer 110 and the anode layer 130; a gas diffusion layer 200 located at least between the electrode assemblies 100 adjacent to each other or both ends of the stack, and including two or more projection parts 220; and an exterior material 300 accommodating the electrode assembly 100 and the gas diffusion layer 200 and having fluid permeability. Preferably, the pouch type metal-air battery 10 is provided so that the gas diffusion layer 200 may include a diffusion portion 210 in contact with the electrode assembly 100; and two or more projection parts 220 extending from the diffusion portion 210. FIG. 3B is a cross-sectional view schematically showing a pouch type metal-air battery 10 according to another embodiment of the present invention. As shown in FIG. 3B, a stack in which four electrode assemblies 100 are stacked may be included, and the gas diffusion layer 200 may include two projection parts 220 and may be located between the electrode assemblies 100 adjacent to each other. Particularly, the pouch type metal-air battery 10 according to an exemplary embodiment of the present invention is provided in a stack structure in which multiple electrode assemblies 100 may be stacked. Moreover, the space partitioned by the gas diffusion layer 200, electrode assembly 100, and exterior material 300 may be formed by the step caused due to the two or more projection parts 220 and may be more efficiently secured. As such, charging and discharging performance of the battery may be further improved.

The pouch type metal-air battery 10 may include an electrode assembly 100 including a cathode layer 110, an anode layer 130, and a separator 120 located between the cathode layer 110 and the anode layer 130; a gas diffusion layer 200 located on the electrode assembly 100; and an exterior material 300 accommodating the electrode assembly 100 and gas diffusion layer 200 and having fluid permeability. Preferably, the gas diffusion layer 200 may include a diffusion portion 210 in contact with the electrode assembly 100; and one or more projection parts 220 extending from the diffusion portion 210.

The electrode assembly 100 may be a basic cell unit capable of generating electricity. The electrode assembly 100 may include a cathode layer 110, an anode layer 130, and a separator 120 located between the cathode layer 110 and the anode layer 130. The cathode layer 110 may be located on the diffusion portion 210 of the gas diffusion layer 200, and may further include a current collector. However, the cathode layer 110 located on the diffusion portion 210 of the gas diffusion layer 200 may not preferably include a current collector. Specific material of the cathode layer 110 may include carbon black, reduced oxide graphene, carbon nanotubes, and acetylene black, and may preferably include, but is not limited to, a carbon-based material. For example, carbon materials are lightweight and inexpensive materials, so these materials may greatly contribute to improving the energy density and economic efficiency of lithium-air batteries.

In addition, a catalyst included in the cathode layer 110 includes one or more selected from the group consisting of a metal such as Pd, Pt, Ru, RuO, Se, Au, and the like, which is capable of an oxygen reduction reaction and an oxygen evolution reaction, and nickel, Au, and AG, but is not limited to a specific metal.

The current collector that may be included in the cathode layer 110 may include one or more conductive metals selected from the group consisting of stainless steel, aluminum, and nickel, and may preferably include, but is not limited to, porous aluminum. For example, aluminum has high electronic conductivity and is lightweight, which is mainly used for lithium ion batteries, so that porous aluminum (mesh, foam structure) is capable of introducing air required for lithium-air batteries and serves as an electronic conductor.

The anode layer 130 may include at least one selected from a group consisting of the anode active layer 131 and the current collector 132. The anode active layer 131 of the anode layer 130 may include one or more metals selected from the group consisting of lithium metal, sodium, and magnesium and preferably include an electrode containing, but not limited to, a lithium element. For example, the lithium element has the lowest potential and is lightweight, which is capable of greatly improving the energy density of the metal-air battery.

The current collector 132 that may be included in the anode layer 130 may be the same or different from the current collector that may be included in the cathode layer 110. The separator 120 may be made of one or more polymer films selected from the group consisting of polyethylene, polypropylene, and glass fiber.

In addition, the separator 120 may be obtained by impregnating the polymer film with the electrolyte 400 consisting of a lithium salt and an organic solvent. The lithium salt may be one or more selected from the group consisting of, but not particularly limited to, for example, $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, LiF, LiBr, LiCl, Lit LiB $(C_2O_4)_2$, $LiCF_3SO_3$, $LiN(SO_2CF_3)_2$, (LiTFSI), $LiN(SO_2C_2F_5)_2$, LiC $(SO_2CF_3)_3$, and $LiNO_3$. The organic solvent may be one or more selected from the group consisting of, but not limited to, tetraethylene glycol, dimethyl ether, dimethylaceamide, and dimethyl sulfoxide. Preferably, the electrolyte 400 may be used by to mixing 1M LiTFSI with tetraethylene glycol and dimethylether or by mixing 1M $LiNO_3$ with dimethylacetamide.

The gas diffusion layer 200 may be a porous electron conductive layer and may include a porous metal substrate. The porous metal substrate may include one or more selected from the group consisting of nickel foam, aluminum mesh, and stainless mesh, and preferably may include, but is not limited to, porous aluminum. For example, because aluminum has high electronic conductivity and is lightweight, which is mainly used for lithium ion batteries, porous aluminum (mesh, foam structure) is capable of introducing air required for lithium-air batteries and serves as an electronic conductor.

The exterior material 300 is not particularly limited, as long as it includes a plurality of pores 310 and prevents the inflow of moisture or gas such as carbon dioxide in the atmosphere and selectively allows only oxygen to permeate. The exterior material 300 may use a material capable of selectively allowing only oxygen to permeate, and preferably may include one or more selected from the group consisting of polyethyleneterephthalate (PET), high density polyethylene (HDPE), polytetrafluoroethylene, and polymethylmethacrylate. In addition, the exterior material 300 may be a metal organic framework permeable membrane with which one or more polymers selected from the group consisting of polyethyleneterephthalate (PET), high density polyethylene (HDPE), polytetrafluoroethylene, and polymethylmethacrylate are mixed. The material as described above may preferably include a hydrophobic polymer film, and thus has advantages that blocks moisture in the atmosphere and is thin and flexible, which enables compression molding. In addition, the exterior material 300 may further form a resin layer on one surface of the exterior material 300. The material included in the resin layer may include a common material in the technical field related to the present invention, and is not limited to including a specific material. As the exterior material 300 further includes the resin layer on one surface, he adhesion between the exterior material 300 and the electrode assembly 100 may be improved and leakage and volatilization of the electrolyte 400 may be prevented even when pressure is applied to the pouch type metal-air battery.

EXAMPLE

The present invention will be described in more detail through the following examples. The following examples are only examples for helping the understanding of the present invention, and the scope of the present invention is not limited thereto.

Example 1—Pouch Type Metal-Air Battery Including a Gas Diffusion Layer 200 with a Ratio of the Length of Diffusion Portion 210 and the Length of Projection Part 220 being 1:0.2

As a cathode layer 110, carbon nanotube paper (3×5 cm$^2$) was used. Lithium metal (3×5 cm$^2$) having a thickness of 100 μm was used as an anode active layer 131 of an anode layer 130, and copper was used as a current collector 132. As a separator 120, Polyethylene (3.2×5.2 cm$^2$) impregnated in electrolyte 400 in which 1M $LiNO_3$ is mixed with dimethylacetamide was used. Nickel foam (3.6×5.0 mm$^2$) was used as the gas diffusion layer 200. A pouch type metal-air battery 10 according to Example 1 was prepared as shown in FIG. 2A. Specifically, an electrode assembly 100 was prepared, in which a cathode layer 110, a separator 120, an anode active layer 131, and a current collector 132 were sequentially stacked on one surface of the gas diffusion layer 200.

Herein, a ratio of the length of the diffusion portion 210 and the length of the projection part 220 of the gas diffusion layer 200 was 1:0.2. Then, by performing sealing using an exterior material 300 that accommodates the upper portion of the gas diffusion layer 200 and the lower portion of the electrode assembly 100, the pouch type metal-air battery 10 is prepared. Herein, the exterior material 300 was made of PET. A plurality of pores 310 was drilled in the exterior material 300, the pores having a size of 1 μm using an ultra-fine processing laser (a femtosecond laser or an ultraviolet laser as a pulse laser).

Example 2—Pouch Type Metal-Air Battery Including Gas Diffusion Layer 200 with a Ratio of the Length of Diffusion Portion 210 and the Length of Projection Part 220 being 1:0.4

Compared with Example 1, a pouch-type metal-air battery according to Example 2 was prepared in the same manner as Example 1, except that a ratio of the length of the diffusion portions 210 and the length of projection parts 220 in the gas diffusion layer 200 was 1:0.4 instead of 1:0.2.

Comparative Example 1—Pouch Type Metal-Air Battery Including Gas Diffusion Layer 200 without Projection Part 220

Compared with Example 1, a pouch type metal-air battery according to Comparative Example 1 was prepared in the same manner as Example 1, except that the gas diffusion layer 200 included only diffusion portion 210 and no projection part 220.

Comparative Example 2—Pouch Type Metal-Air
Battery Including Gas Diffusion Layer 200 with a
Ratio of the Length of Diffusion Portion 210 and
the Length of Projection Part 220 being 1:0.4

Compared with Example 1, a pouch type metal-air battery was prepared in the same manner as Example 1, except that the ratio of the length of the diffusion portions 210 and the length of the projection parts 220 in the gas diffusion layer 200 was 1:0.6, instead of 1:0.2.

Experimental Example—Comparison of Capacities
of Pouch Type Metal-Air Batteries According to
Pressure and the Ratio of the Length of Diffusion
Portion 210 and the Length of Projection Part 220
in Gas Diffusion Layer 200

After the pouch-type metal-air batteries according to Examples 1 and 2 and Comparative Examples 1 and 2 were prepared, the capacity according to external pressure was confirmed for each battery, and then each result thereof is shown in Table 1 below.

TABLE 1

| Capacity | External Pressure(kgf/cm$^2$) | | |
| --- | --- | --- | --- |
|  | 0.59 | 0.98 | 1.3 |
| Comparative Example and Example |  |  |  |
| Comparative Example 1 | 1 mAh/cm$^2$ | 0 mAh/cm$^2$ | 0 mAh/cm$^2$ |
| Example 1 | 4 mAh/cm$^2$ | 3 mAh/cm$^2$ | 2 mAh/cm$^2$ |
| Example 2 | 26 mAh/cm$^2$ | 24 mAh/cm$^2$ | 22 mAh/cm$^2$ |
| Comparative Example 2 | 25 mAh/cm$^2$ | 24 mAh/cm$^2$ | 24 mAh/cm$^2$ |

Figure 4:
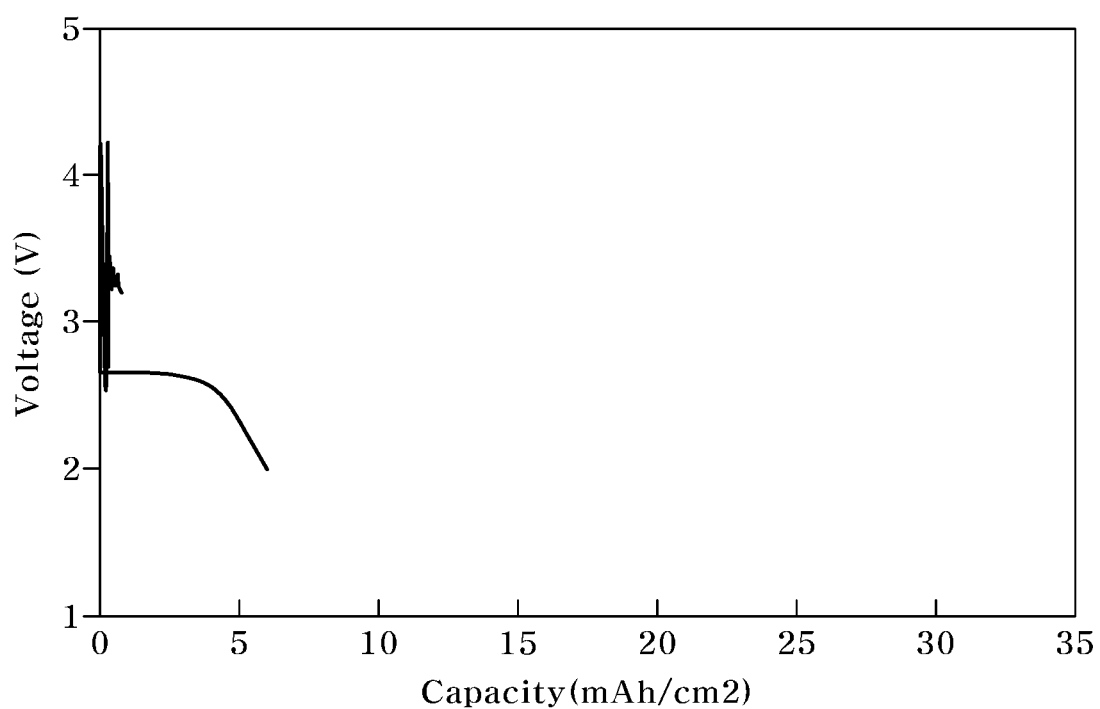
FIG. 4 is a graph showing the capacity varied depending on the applied voltage of a pouch type metal-air battery prepared according to Comparative Example 1.

As shown in Table 1, the larger the external pressure applied to the pouch type metal-air battery according to exemplary embodiments of the present invention, the less contact resistance, which is advantageous for lithium ion/electron conduction. However, the excessive external pressure made it difficult to introduce oxygen into the oxygen diffusion path along the side of the gas diffusion layer 200 because the pores 310 of the exterior material 300 (oxygen permeable film) were blocked due to the pressing of the assembly or the squeeze out of the electrolyte 400, thereby making it difficult to form a discharge product and having low discharge capacity. In addition, as shown in Comparative Example 1, when the gas diffusion layer 200 did not include the projection part 220, but only the diffusion portion 210, it was difficult to drive the cell, as shown in FIG. 4 and Table 1.

Meanwhile, as in Example 1 and Example 2, in the case of the metal-air battery, in which the projection part 220 was included in the gas diffusion layer 200 in a length ratio of 0.2 to 0.4 compared to the diffusion portion 210, since the gas diffusion layer 200 was extended irrespective of external pressure to have the projection part 220 of an appropriate length, the electrolyte 400 was squeezed out not to be deviated from the intrusion range. As such, it is possible to secure the minimum range in which oxygen may be diffused by the anode active layer 131 in the electrode assembly 100 to allow oxygen to sufficiently flow in and thus ORR discharging to be normally operated.

Meanwhile, the metal-air battery, in which the projection part 220 was included in the gas diffusion layer 200 in the length ratio of 0.6 compared to the diffusion portion 210 as in Comparative Example 2, shows discharge capacity that was almost the same to in Example 2 according to the varying external pressure. Therefore, the gas diffusion layer 200 including the projection part 220 of an excessive length was inefficient in terms of energy density.

As a result, even when the electrolyte 400 inside the cell comes out of the electrode assembly 100 by applying external pressure, the pouch type metal-air battery according to various exemplary embodiments of the present invention may be designed so that the electrolyte 400 does not reach the space partitioned by the gas diffusion layer 200, the electrode assembly 100 and the exterior material 300 due to the step caused by the projection part 220 of the gas diffusion layer 200. As such, the plurality of pores 310 in the exterior material 300, which corresponds to the space, is not blocked. Therefore, since oxygen selectively permeated from the exterior material 300 flows into the gas diffusion layer 200, and flows into the electrode assembly 100 through the diffusion portion 210 of the gas diffusion layer 200, the contact resistance with pressure may improve and the initial driving conditions and driving reproducibility may be secured in the pouch type metal-air battery.

What is claimed is:

1. A pouch type metal-air battery, comprising:
    an electrode assembly comprising a cathode layer, an anode layer, and a separator located between the cathode layer and the anode layer;
    a gas diffusion layer (GDL) located on the electrode assembly; and
    an exterior material accommodating the electrode assembly and the gas diffusion layer and having fluid permeability,
    wherein the gas diffusion layer comprises a diffusion portion in contact with the electrode assembly; and one or more projection parts extending from the diffusion portion,
    wherein a ratio of a length of the diffusion portion and a length of the projection part is 1:0.2 to 1:0.4.

2. The battery of claim 1, wherein a step between the electrode assembly and the gas diffusion layer (200) is formed by the projection part, and a space partitioned by the gas diffusion layer, the electrode assembly, and the exterior material is formed.

3. The battery of claim 1, wherein the gas diffusion layer comprises two or more projection parts.

4. The battery of claim 1, further comprising:
    a stack in which multiple electrode assemblies are stacked, wherein the gas diffusion layer is located at least between the electrode assemblies adjacent to each other or both ends of the stack.

5. The battery of claim 1, wherein the battery is operated under pressure of 0.59 to 1.3 kgf/cm$^2$.

6. The battery of claim 1, wherein the diffusion portion of the gas diffusion layer is located on the cathode layer.

7. The battery of claim 1, wherein the gas diffusion layer comprises a porous metal substrate.

8. The battery of claim 7, wherein the porous metal substrate comprises one or more selected from the group consisting of nickel foam, aluminum mesh, and stainless mesh.

9. The battery of claim 1, wherein the cathode layer comprises one or more selected from the group consisting of carbon paper, carbon black, reduced oxide graphene, carbon nanotube, and acetylene black.

10. The battery of claim 1, wherein the cathode layer comprises one or more catalysts selected from the group consisting of nickel, gold (Au), silver (Ag), rubidium (Ru), and platinum (Pt).

11. The battery of claim 1, wherein the exterior material comprises a plurality of pores.

12. The battery of claim 1, wherein the exterior material is capable of selectively allowing oxygen to permeate.

13. The battery of claim 12, wherein the oxygen permeated from the exterior material flows into the gas diffusion layer (GDL) and flows into the electrode assembly through the diffusion portion of the gas diffusion layer (GDL).

14. The battery of claim 1, wherein the exterior material comprises one or more materials selected from the group consisting of plyethyleneterephthalate (PET), high density polyethylene (HDPE), plytetrafluoroethylene, and pymethylmethacrylate.

15. The battery of claim 1, wherein the exterior material is a metal organic framework permeable membrane with which one or more polymers selected from the group consisting of plyethyleneterephthalate (PET), high density polyethylene (HDPE), polytetrafluoroethylene, and polymethylmethacrylate are mixed.

* * * * *